Dec. 1, 1970   E. S. FRIEDLANDER ETAL   3,544,885
VOLTAGE STABILISING ARRANGEMENTS FOR ALTERNATING CURRENT
SUPPLIES UTILIZING SATURATED SHUNT REACTORS
Filed April 15, 1968                              2 Sheets-Sheet 1
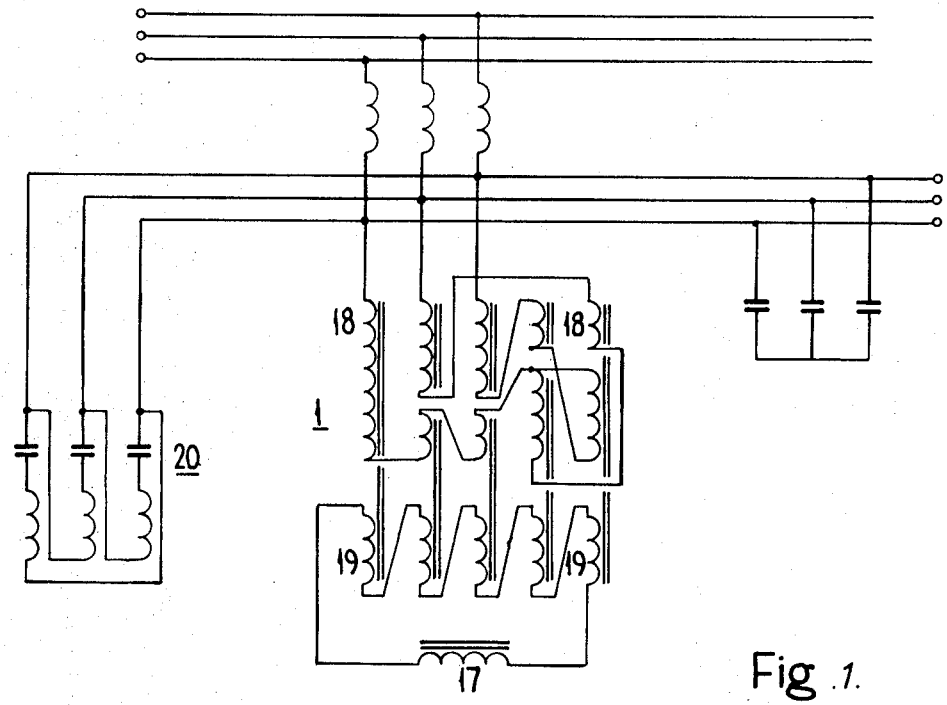
Fig. 1.
PRIOR ART
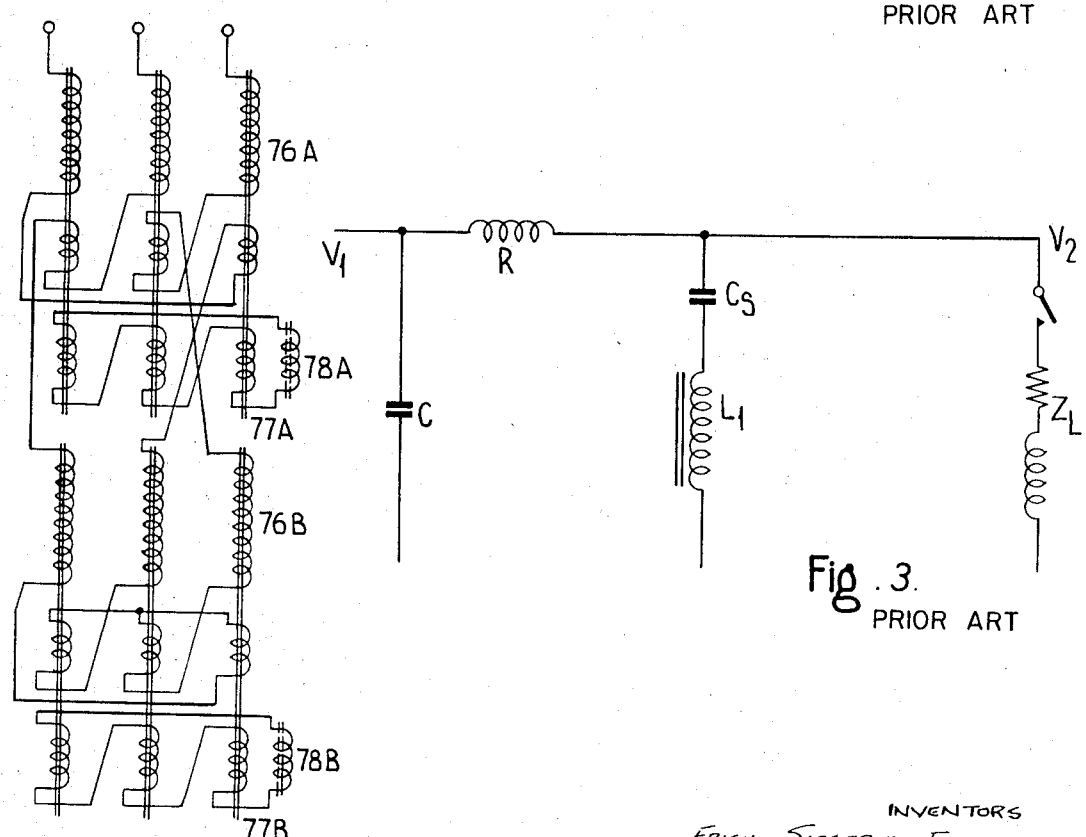
Fig. 2.
PRIOR ART
Fig. 3.
PRIOR ART
INVENTORS
ERICH SIEGFRIED FRIEDLANDER
DAVID JOHN YOUNG
BY
ATTORNEYS Dec. 1, 1970  E. S. FRIEDLANDER ETAL  3,544,885
VOLTAGE STABILISING ARRANGEMENTS FOR ALTERNATING CURRENT
SUPPLIES UTILIZING SATURATED SHUNT REACTORS
Filed April 15, 1968                              2 Sheets-Sheet 2

INVENTORS
ERICH SIEGFRIED FRIEDLANDER
DAVID JOHN YOUNG

BY
ATTORNEYS

United States Patent Office 3,544,885
Patented Dec. 1, 1970

3,544,885
VOLTAGE STABILISING ARRANGEMENTS FOR ALTERNATING CURRENT SUPPLIES UTILIZING SATURATED SHUNT REACTORS
Erich Siegfried Friedlander, Sutton Coldfield, and David John Young, Edgbaston, England, assignors to The General Electric Company Limited, London, England, a British company
Filed Apr. 15, 1968, Ser. No. 721,424
Claims priority, application Great Britain, Apr. 26, 1967, 19,275/67
Int. Cl. G05f 3/04
U.S. Cl. 323—61
12 Claims

ABSTRACT OF THE DISCLOSURE

A voltage stabilising arrangement for alternating current supplies which makes use of saturated reactors connected in shunt with the supply system and wound and connected in such a manner as to suppress certain odd harmonics, together with auxiliary stabilising means for selectively suppressing instability-producing even or near-even harmonics and sub-harmonics.

---

Figure 4:
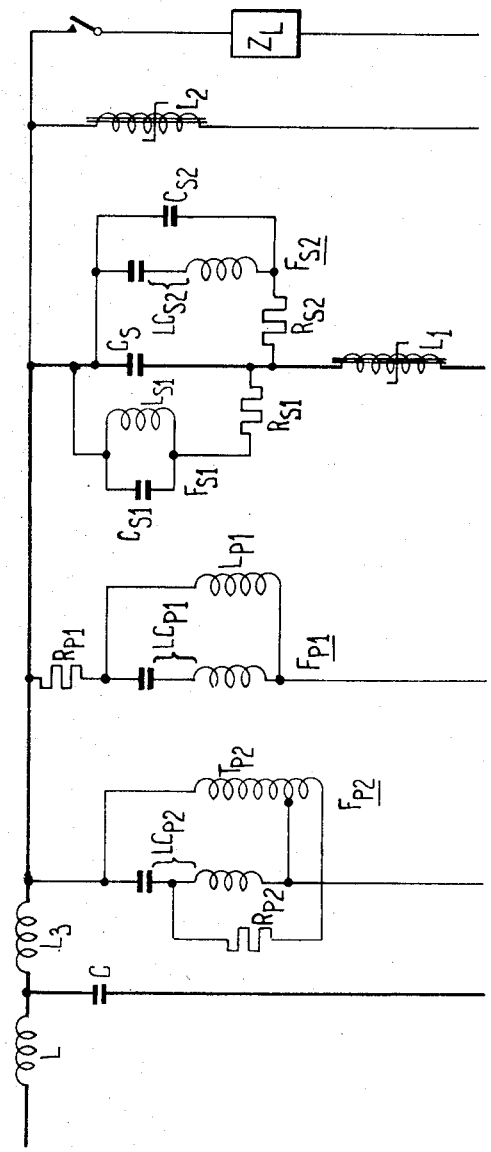

This invention relates to voltage stabilising arrangements for alternating current supplies, and in particular to stabilising arrangements of this kind comprising at least one group of alternating current saturated reactors, adapted to be connected in shunt with the supply system and usually with system capacitances or static capacitor banks.

One such voltage stabilising arrangement which is described in patent application Ser. No. 567,163 (now Pat. No. 3,450,981) incorporates a set of one or more series-connected groups of primary alternating current saturated reactors having a total of $n$ wound reactor cores connectable in shunt with the supply system, where $n$ is at least equal to five and $n/p$ is an integer, $p$ being the number of groups, and wherein the $n$ reactor cores are wound as for frequency multiplication, having primary windings connected so as to subject corresponding core fluxes to a phase displacement of $180°/n$ relative to one another for the suppression of harmonics below $2n-1$, and secondary windings in the form of a $n/p$-phase mesh in each of the $p$ groups, with a compensating reactor itself operable in the saturated condition connected into the mesh.

It has been found that in operation of such an arrangement there is a marked flattening of the top of the flux-wave produced in each of the reactor cores, this giving improved stability against sub-harmonics caused by the interaction between the saturated reactor and capacitances of the system, compared with arrangements of the kind having parallel harmonic-compensating windings and short circuited mesh windings producing a sinusoidal flux wave in the reactor cores particularly where $n$ is at least equal to five. Such a stabilized saturated reactor arrangement may, for example, be used to reduce voltage fluctuations in electric supply networks having a common bus-bar system feeding a plurality of fluctuating loads, such as arc furnaces connected in parallel to the bus-bar system.

The arrangement may incorporate, in addition, capacitors connected in series with said saturated reactors to control the voltage change required to produce a given change to reactive current, together with shunt capacitors connected in parallel with the reactors and associated series capacitors to supply the capacitive power requirements of the load and any additional requirements which may be due, for example, to line impedance, the use of such series and shunt capacitors providing a still further improvement in stability for some applications of the invention.

Although such arrangements have been found to be less liable to instabilities compared with known arrangements in which a sinusoidal flux wave is produced in the primary saturated reactor cores, as has been previously explained, instabilities can still in some cases arise under certain conditions of operation in spite of the effective exclusion of odd harmonics, and we have found that this is due to self-excitation of higher even or near even harmonics and/or sub-harmonics.

The essence of the conditions to prevent self-excitation of such harmonics is that the frequency response characteristic of the system as seen from the saturated reactor must comply with certain relationships of phase angle and reactive behaviour which can be satisfied without the filter network proposed carrying other than currents of fundamental frequency. This makes it possible to design stabilising filters for the suppression of the instability-producing even or near even harmonics and/or sub-harmonics without causing significant losses.

According, therefore, to the present invention in a saturated reactor voltage stabilizing arrangement as claimed in claim 1 of Pat. No. 3,450,981, having capacitors connected in series with a set of primary saturated reactors for controlling the voltage change required to produce a given change of reactive current, together with at least one shunt capacitor connected in parallel with the reactor set and associated series capacitors, there is provided, in addition, auxiliary stabilizing means associated with the reactor set for selectively suppressing instability-producing even or near even harmonics and/or sub-harmonics.

For example in cases where instabilities arise from the generation of even harmonics, filters for absorbing such harmonics may be connected in parallel with the main shunt capacitance.

For the suppression of sub-harmonics plain reactors or filters tuned to the appropriate frequency can be connected in parallel with the series capacitors.

Either or both forms of filter can be used, as necessary, and in order to reduce losses to a minimum each form of filter may be selectively damped in any convenient manner by suppressing current at the fundamental frequency in any damping resistors required with respect to the frequency, the self-excitation of which is to be suppressed, and one or more selective filters may be arranged to cover frequency bands instead of specific frequencies where necessary.

A pre-stabilizing reactor may in some cases be used to eliminate or reduce the effect of high line impedances.

Several different forms of filter circuit suitable for use in a voltage stabilizing arrangement using saturated reactors in which the dominant odd harmonics are effectively suppressed in accordance with the invention will now be described by way of example with reference to FIGS. 1 to 6 of the accompanying schematic drawings.

In the drawings FIGS. 1 and 2 illustrate two different forms of saturaed reactor voltage stabilizing arrangement as described in Patent No. 3,450,981.

Figure 6:
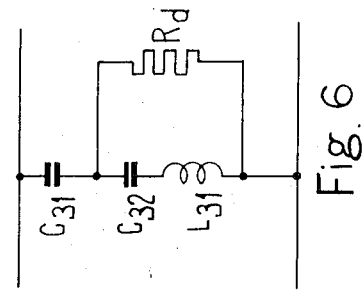
Figure 5:
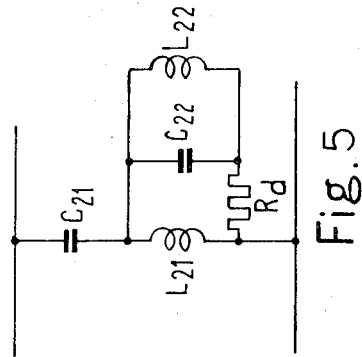

FIG. 3 illustrates diagrammatically the incorporation of series and shunt capacitors, FIG. 4 illustrates diagrammatically the application of auxiliary stabilizing means, provided by different forms of selective filters, to such a saturated reactor voltage stabilizing arrangement for suppressing higher even or near even harmonics and/or sub-harmonics in the stabilizing arrangement, in accordance with the present invention, FIG. 5 illustrates an alternative form of selective filter for the auxiliary stabilizing means, and FIG. 6 illustrates a further alternative form of selective filter.

Referring first to FIG. 1, this represents a voltage stabilizer in accordance with the invention forming the subject of Patent No. 3,450,981 incorporating a five core saturated reactor arrangement 1 ($n=5$) the reactors having primary windings 18 connected in the manner of voltage quintupler network for the suppression of harmonics below the ninth. Secondary windings 19 are connected in mesh and a reactor 17 is connected in series in the mesh, which series reactor is arranged to operate in the saturated condition in use of the arrangement, and it has been found that this results in a substantial reduction in the 9th and 11th harmonics.

FIG. 2 illustrates a different form of voltage stabilizer in accordance with the invention covered by Patent No. 3,450,981, this voltage stabilizer incorporating two identical three-core saturated reactor groups ($n=6$), these groups 76A and 76B having zig-zag windings connected to give a $\pm 15°$ phase shift between the core fluxes of the two reactor groups, the sign reversal being obtained by reversal of the phase-sequence connection between the groups.

In addition each reactor group 76A, 76B has a secondary mesh winding 77A, 77B, incorporating a saturating compensating reactor 78A, 78B, respectively connected in series in the mesh, and designed so that residual harmonics in the respective primary currents of the order of $2n\pm1$ are reduced at least approximately to a minimum; the arrangement gives a displacement in phase of the triple harmonic currents circulating through the compensating reactors of 90°. It has been found that in this arrangement in addition to the suppression of the 5th and 7th harmonics by the phase shift principle of compensation, the 11th and 13th harmonics are also effectively suppressed by the current circulating through the compensating reactors over effectively the whole range of voltage and current for which the arrangement is designed to be used.

Such voltage stabilizers may, as shown in diagrammatic form in FIG. 3, incorporate in series with the saturated reactor $L_1$ a series-connected slope correction capacitor $C_s$ for controlling the voltage change required to produce a given change of reactive current. In this figure, which is shown in single phase for simplicity, R represents the line reactance and $Z_L$ the load.

Shunt capacitors may also be connected in parallel with groups of saturated reactors combined with such series "slope correction" capacitors to supply the capacitive power requirements of the load and those additional requirements which may be due to the line resistance, and such a shunt capacitor is shown at C.

While such arrangements have been found to be less liable to instabilities than those previously proposed, some instability may still arise under certain conditions of operaton due to the self-excxtation of higher even or near even harmonics and/or sub-harmonics as previously explained.

Such harmonics can, however, be suppressed in accordance with the present invention by the provision of particular forms of auxiliary stabilizing means.

Referring now to FIG. 4, this represents a single line diagram of one phase of a voltage stabilizing arrangement for a supply system having an inductance L and a shunt capacitance C, including any capacitances as may form part of the voltage stabilizing arrangement, the arrangement incorporating a saturated stabilizing reactor $L_1$ connected in parallel with the load circuit $Z_L$ with respect to the supply system, the stabilizing reactor representing a set not shown in detail but which may be of the form illustrated in FIG. 1 or 2, having secondary windings connected in mesh, with a choke associated in series in the mesh of each group within the set and chosen so that odd harmonics of the order $2n\pm1$, where $n$ is the number of reactor cores in the set, are a minimum.

The reactor has connected in series with it a capacitor $C_s$ for controlling the voltage change required to produce a given change in reactive current.

In order to avoid self-excitation of even or near even harmonics and/or sub-harmonics the arrangement includes, in accordance with the present invention, auxiliary stabilizing means in the form of one or more selective filters as necessary.

For example $F_{P1}$ is a filter designed to absorb a specific even harmonic such as the 2nd or 4th and comprises series resonance elecents $LC_{P1}$ tuned to near the frequency to be most strongly damped and in series with a resistance $R_{P1}$, the combination being connected in shunt with the saturated reactor $L_1$ and series capacitor $C_s$. A shunt reactor $L_{P1}$ connected across the series resonance elements $LC_{P1}$ is tuned to absorb the capacitive power of the filter at the fundamental frequency of the supply system so that not more than a small residue current at said fundamental frequency flows through the resistance $R_{P1}$ under stable operating conditions.

Also illustrated is an alternative filter $F_{P2}$ which is also tuned to absorb a specific even harmonic and which contains similar series resonance elements $LC_{P2}$, but which incorporates a different form of damping. This is provided by a transformer $T_{P2}$ tapped in the ratio of the fundamental impedances of the resonant filter elements, and with part shunted directly across them. The junction of the two elements is connected through a damping resistance $R_{P2}$ to the free end of the transformer $T_{P2}$ as shown. These points are at substantially the same potential only at the fundamental frequency of the supply so that no appreciable current at the fundamental frequency flows in the resistance, but there is a strong damping effect at the resonant frequency.

Filters for suppressing sub-harmonics can be connected in parallel with the series capacitor $C_s$ and two such filters $F_{S1}$ and $F_{S2}$ are illustrated in the drawing.

The filter $F_{S1}$ comprises a reactor $L_{S1}$ and resistor $R_{S1}$ connected across the series capacitor as shown, the combination preventing any changing of the series capacitor by direct current or by low frequency sub-harmonics, and thus being effective to damp out instabilities which might be caused by such sub-harmonics. A capacitor $C_{S1}$ is also shown connected across the reactor $L_{S1}$, the capacitor being tuned with the reactor to resonate with the fundamental frequency of the supply so that the resistor $R_{S1}$ is effective for damping any sub-harmonics generated but carries no appreciable current at said fundamental frequency under stable operating conditions. In some cases it may be found that the presence of the resistor $R_{S1}$ is not required, in which cases it may be omitted and $C_{S1}$ will then be combined with $C_s$.

The filter $F_{S2}$ incorporates series resonant elements $LC_{S2}$ tuned to a sub-harmonic frequency required to be strongly damped and is connected across the series capacitor $C_s$ in series with a damping resistor $R_{S2}$. A shunt capacitor $C_{S2}$ is connected across the series resonant elements and tuned to absorb the inductive power at the fundamental frequency of the supply so that no appreciable current at said fundamental frequency flows through the resistor $R_{S2}$ under stable operating conditions.

The circuit arrangement may include in addition a saturated pre-stabilising reactor shown at $L_2$ connected in shunt with the series combination of main saturated reactor $L_1$ and series capacitor $C_s$, or alternatively this could be replaced by a D.C. excited reactor (transductor), means being provided where desirable for controlling the direct current flowing through the control winding of the transductor in response to changes in the main reactor current.

A further linear reactor shown at $L_3$ may also be inserted into the circuit between the shunt capacitor C and the filter circuits to provide a buffering effect for harmonics which enables the size of the filters to be kept comparatively small.

It will of course be understood that the different filter arrangements have been illustrated by way of example and that the filter or filter utilised in any particular voltage stabilising arrangement will depend upon the harmonics required to be suppressed and may be used individually or in selected combinations as the circuit conditions require. In some circumstances it will be sufficient to provide only single or two phase filters connected between lines for economy.

Alternatively or in addition to those filters above described other suitable forms of filters may be used in combination with rejection filters connected in series with, or absorption filters by-passing, damping resistors and tuned to the network frequency in either case to suppress losses due to the fundamental frequency in such filters.

For example some further filters which have been found particularly suited for use in a voltage stabilising arrangement in accordance with the invention, and designed for connecting in parallel with the saturated reactor $L_1$ and series capacitor $C_S$, are as illustrated in FIGS. 2 and 3 of the drawings.

Referring to FIG. 5 the filter shown therein comprises a series combination of a capacitor $C_{21}$ and reactor $L_{21}$, the reactor having connected across it, in series, a further reactor $L_{22}$ and damping resistance $R_d$ and a further capacitor $C_{22}$ is shunted across the second reactor $L_{22}$. The filter is tuned to cover a broad frequency band, for damping both 2nd and 4th harmonics whilst ensuring negligible losses for the fundamental frequency.

In the filter illustrated in FIG. 6 a reactor $L_{31}$ is connected in series with two capacitors $C_{31}$ and $C_{32}$, a damping resistor $R_d$ being shunted across the reactor $L_{31}$ and adjacent capacitor $C_{32}$ as shown, the filter being tuned to give the required damping effect for a specific harmonic but with negligible current flow in the resistance at the fundamental frequency. This filter may serve to introduce adequate damping for a range of frequencies.

We claim:

1. In a voltage stabilizing arrangement for an alternating current supply system comprising a set of one or more series-connected groups of primary alternating current saturated reactors having a total of $n$ wound reactor cores connnectable in shunt with the supply system, where $n$ is at least equal to five and $n/p$ is an integer, $p$ being the number of groups, and wherein the $n$ reactor cores are wound as for frequency multiplication, having primary windings connected so as to subject corresponding core fluxes to a phase displacement of $180°/n$ relative to one another for the suppression of harmonics below $2n-1$, and secondary windings in the form of a $n/p$-phase mesh in each of the $p$ groups, with a compensating reactor itself operable in the saturated condition connected into the mesh, that improvement comprising: capacitors connected in series with a set of primary saturated reactors for controlling the voltage change required to produce a given change of reactive current, at least one shunt capacitor connected in parallel with the reactor set and assoiated series capacitors, and auxiliary stabilizing means associated with the reactor set for selectively suppressing instability-producing even or near even harmonics and/or sub-harmonics.

2. A voltage stabilising arrangement according to claim 1 incorporating at least one selective filter for absorbing even harmonics connected in parallel with the main shunt capacitance.

3. A voltage stabilising arrangement according to claim 2, wherein each said filter is selectively damped to avoid noticeable losses at the fundamental frequency.

4. A voltage stabilising arrangement according to claim 2, wherein the filter comprises series resonance elements tuned to the frequency to be most strongly damped connected in series with a resistance, and the combination is connected in parallel with the saturated reactor and series capacitor, and wherein a shunt reactor is connected across the series resonance elements and is tuned to absorb the capacitive power of the filter at the fundamental frequency of the supply so that not more than a small residue current at the fundamental frequency flows through the resistance under stable operating conditions.

5. A voltage stabilising arrangement according to claim 2 wherein the filter comprises series resonance elements tuned to the frequency to be most strongly damped, and the combination is connected in parallel with the saturated reactor and series capacitor, the arrangement including also an auto-transformer tapped in the ratio of the fundamental impedances of the resonant filter elements, and with part shunted directly across them, the junction of the elements being connected through a damping resistance to the free end of the transformer, and the arrangement being such that the ends of the resistance are at substantially the same potential only at the fundamental frequency of the supply so that no appreciable current at said fundamental frequency flows in the resistance, but such that there is a strong damping effect at the resonant frequency.

6. A voltage stabilising arrangement according to claim 1 incorporating at least one filter each tuned to an appropriate sub-network frequency in association with said series capacitors.

7. A voltage stabilising arrangement according to claim 3 wherein the filter comprises a reactor and a resistor connected across the series capacitor for preventing any charging of the series capacitor by direct current or by low frequency sub-harmonics, and thus being effective to damp out instabilities which might be caused by such harmonics, the arrangement including also a further capacitor connected across the filter reactor, the capacitor being tuned with the reactor to resonate with the fundamental frequency of the supply so that the resistor is effective for damping any sub-harmonics generated but carries no appreciable current at said fundamental frequency under stable operating conditions.

8. A voltage stabilising arrangement according to claim 3 wherein the filter comprises series resonance elements tuned to a sub-harmonic frequency required to be strongly damped and connected across the series capacitor in series with a damping resistor, a shunt capacitor being connected across the series resonant elements and being tuned to absorb the inductive power at the fundamental frequency of the supply so that no appreciable current at said fundamental frequency flows through the resistor under stable operating conditions.

9. A voltage stabilising arrangement according to claim 1 wherein the auxiliary stabilising means includes at least one selective filter tuned to cover a required frequency band.

10. A voltage stabilising arrangement according to claim 5, wherein the filter comprising a series combination of a capacitor and reactor connected in parallel with the saturated reactor and series capacitor, the filter reactor having shunted across it a further reactor and a resistance in series, with a further capacitor shunting the latter reactor, the filter being tuned to cover a broad frequency band for damping both second and fourth harmonics of the fundamental frequency of the supply.

11. A voltage stabilising arrangement according to claim 1 including also a pre-stabilising reactor for eliminating or reducing the effect of high line impedances.

12. A voltage stabilising arrangement according to claim 1 incorporating a series resonant filter circuit comprising reactance and capacitance connected in parallel with the saturated reactor and series capacitor, the capacitance comprising a plurality of series-connected capacitors, and wherein a damping resistance is connected across the resistance and at least one but not all of said series-connected capacitors.

References Cited

UNITED STATES PATENTS

| | | | |
|---|---|---|---|
| 1,962,910 | 6/1934 | Rives | 333—76 |
| 2,182,377 | 12/1939 | Guanella | 323—76X |
| 2,241,831 | 5/1941 | Wahlquist | 333—76X |
| 2,264,151 | 11/1941 | Reid | 333—76X |
| 2,561,087 | 7/1951 | Anderson | 333—76X |
| 3,038,134 | 6/1962 | Forssell | 333—76X |

J D MILLER, Primary Examiner

A. D. PELLINEN, Assistant Examiner

U.S. Cl. X.R.

323—77, 81